Dec. 16, 1941.  W. S. HINMAN, JR  2,266,038
RADIO DIRECTION FINDER
Filed Nov. 26 1932   2 Sheets—Sheet 1
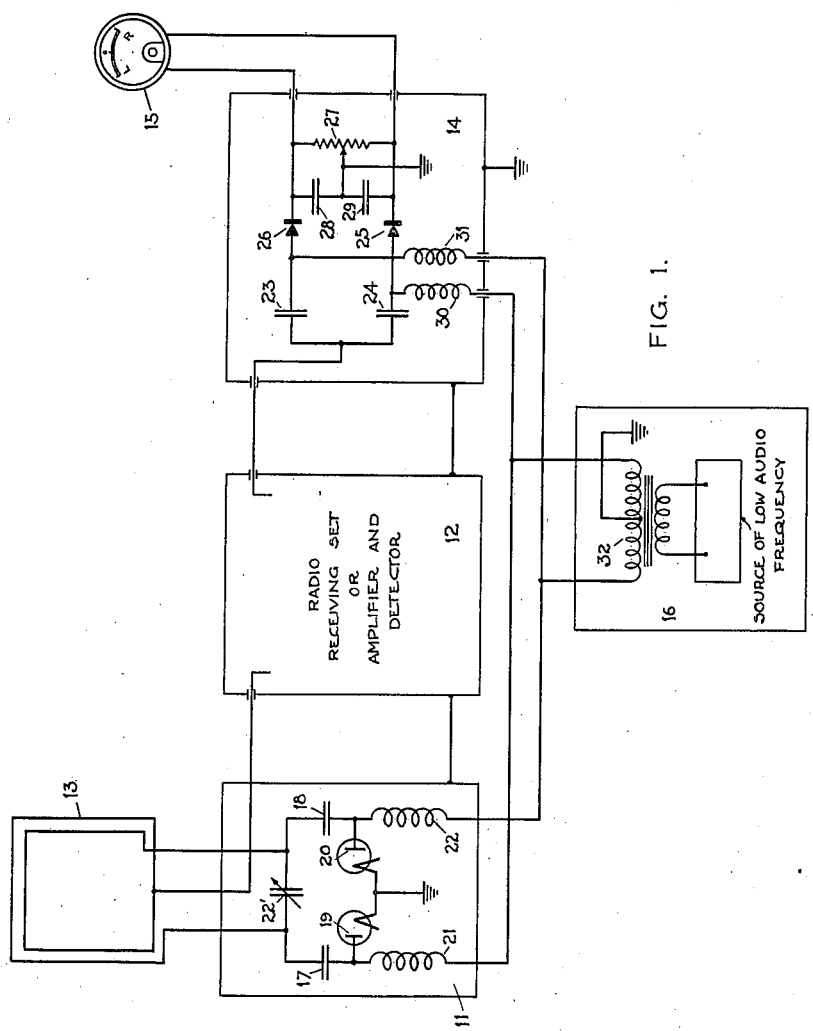
Inventor
Wilbur S. Hinman Jr.
By J. F. Mothershead
Attorney Dec. 16, 1941.   W. S. HINMAN, JR   2,266,038
RADIO DIRECTION FINDER
Filed Nov. 26 1932   2 Sheets-Sheet 2

Inventor
Wilbur S. Hinman Jr.
By J. F. Mothershead
Attorney

Patented Dec. 16, 1941

2,266,038

UNITED STATES PATENT OFFICE 2,266,038

RADIO DIRECTION FINDER

Wilbur S. Hinman, Jr., Springfield, Mass., assignor to the Government of the United States, represented by the Secretary of Commerce Application November 26, 1932, Serial No. 644,485

10 Claims. (Cl. 250—11)

(Granted under the act of March 3, 1883, as amended April 30, 1928; 370 O. G. 757)

The invention described herein may be manufactured and used by or for the Government of the United States for governmental purposes only, without the payment of any royalty thereon.

My invention relates to a new and improved radio direction finder for determining the direction of a transmitting station, and for position finding by means of cross bearings on transmitting stations. It is also useful as homing device for directing a moving airplane, boat or other vehicle to the transmitting station.

The new features of this direction finder includes (1) a single loop antenna input circuit arrangement requiring no special or critical adjustments, having directional sense, and having sense of deviation, right or left, from the true bearing of the transmitting station; (2) a new output unit automatically synchronized with the input unit, with means for securing zero center course indication by means of a course indicating meter.

The direction finder operates with any ordinary radio receiver on signals from any transmitting station by the addition of an input unit, an output unit, and a synchronizing unit. The input unit serves to rapidly switch the connections of the loop antenna so that the phase of the voltages developed in the loop antenna, and applied to the radio receiver, is rapidly reversed. As will be explained in the following text, the relative intensity of these two sets of voltages depends upon the orientation of the loop antenna. When the plane of the loop antenna is perpendicular to the direction of the station received, the two sets of voltages are equal. If the loop antenna is rotated, say, to the right, one set of voltages becomes greater than the other, while if the loop antenna is rotated to the left the reverse is true.

The receiving set amplifies and detects these voltages and applies the resultant audio-frequency voltages to the output unit. The latter comprises a rectifying arrangement and a switching device for reversing the rectified current through the course indicating instrument.

The synchronizing unit supplies the alternating voltages for accomplishing the switching in the input and output units by electrical means, thereby avoiding mechanical switching with attendant trouble from arcing contacts. The synchronizing unit also serves to synchronize the switching in the input and output units so that for one connection of the loop antenna to the receiving set, the rectified output current passes through the course indicating instrument in a given direction, while for the second connection of the loop antenna to the receiving set, the flow of rectified current through the course indicator is reversed.

The method of using this direction finder is now evident. When the plane of the loop antenna is perpendicular to the direction of the transmitting station being received, the two sets of voltages alternately applied from the loop antenna to the receiving set (and consequently the two sets of audio-frequency voltages applied to the output unit), are equal. The rectified currents passing through the course indicating instrument are therefore also equal. Since these two sets of currents flow through the course indicator in opposite directions, because of the synchronous switching of the input and output units, the resultant current through the course indicator is zero. The latter may, therefore, be of a zero-center pointer type and will read "on course" for the condition outlined. A little consideration will show that if the loop antenna is now rotated to the left, the rectified current passing through the course indicator in one direction will be greater than that in the reverse direction. The course indicator may therefore be connected so that its pointer will deflect to the left. Now, if the loop antenna is rotated to the right of course, the course indicator pointer will obviously deflect to the right. If, however, the loop antenna is rotated 180°, the pointer will also read "on course," but when the loop antenna is rotated right or left the direction of the pointer movement is reversed. This direction finder therefore gives not only an indication of the direction of the received station but also sense of deviation of the line of flight of the airplane from this direction.

By providing means whereby one may rotate the loop antenna by remote control, this direction finder may be used not only as a homing device but also for triangulation by getting bearings on two or more ground stations.

In the accompanying drawings:

Figure 1 diagrammatically represents one form of my apparatus.

Figure 3:
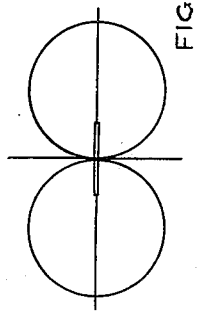
Figure 3 is a field intensity pattern of normal form for a balanced loop antenna.

A brief description of one form of my apparatus and the circuit arrangement is given. Referring to Figure 1, 11 is an input unit of the direction finder and comprises the loop antenna tuning and switching arrangement. 12 is a radio receiver, used for amplifying and detecting the signal received on a loop antenna 13. 14 is an output unit which is synchronized with the input unit 11. Zero-center course indication is obtained by means of meter 15. 16 is a synchronizing unit and supplies synchronizing voltage to input unit 11 and output unit 14 properly phased to secure proper reversal of the meter of unit 14 as the field pattern of the loop antenna is reversed.

Referring to 11 of Fig. 1, loop antenna 13 is connected at each terminal through blocking condensers 17 and 18 to rectifier tubes 19, 20 the filaments of which are connected together and grounded. Two equal alternating voltages, of the same frequency but opposite in phase, are applied from ground to the plates of 19 and 20 through equal radio-frequency inductors 21 and 22. Consequently, when a positive voltage is applied to the plate of 19, a negative voltage is applied to the plate of 20, and vice versa. It is well known that when a positive voltage is applied to the plate of a suitable rectifying device the resistance of that device is relatively low, but when a negative voltage is applied to the plate its resistance is relatively high. For this reason the ground is effectively placed at each end of the loop antenna, alternately, once for each cycle of the alternating voltages supplied by the synchronizing unit 16 and the normal field pattern of the loop antenna is altered as previously explained. The voltage developed in the loop antenna is applied to unit 12 the radio receiver, between the center of the loop antenna and ground.

A tuning condenser 22 is not strictly necessary for the operation of this device. However, if 22 is not used, the loop antenna is untuned, and its pickup will vary considerably with the tuning of the radio receiver. When 22 is used the loop antenna is aways tuned to a point off resonance, in a predetermined manner so that the circuit of the loop antenna 13 and tuning condenser 22 is either always capacitive or always inductive for any given frequency in the frequency range of the receiving set. This may be accomplished by coupling the condenser 22 to the tuning unit of the radio receiver so the circuit is always off resonance to the frequency of the radio receiver.

It is not necessary that the rectifier tubes 19 and 20 be carefully matched to have the same resistance, but they should be normal rectifiers of the same type. An ordinary three-element triode may be used, with the grid and plate connected together as the anode, or a full wave rectifier tube may be used to serve for both rectifiers.

The radio receiver 12 requires no explanation, being any of the usual types, for example, a radio-frequency amplifier, a detector and an audio amplifier. It must, of course, be capable of receiving the frequencies for which the loop antenna is designed.

The circuit arrangement of output unit 14 is shown in Fig. 1. 23 and 24 are two equal capacitors, one terminal of each being connected to the output of the radio receiver, and the other terminal of each connected to half wave rectifiers 25 and 26 respectively, which pass current only when a positive voltage is applied to them. The other terminals of 25 and 26 are connected one to each side of a voltage divider 27 to zero-center meter 15, and to condensers 28 and 29 as shown. The condensers 28 and 29 are each connected to ground at one terminal and the center tap or movable arm of voltage divider 27 is connected to ground. The half wave rectifiers 25 and 26 are supplied with equal alternating voltages, of the same frequency but opposite in phase, through inductors 30 and 31. Thus, when a positive voltage is applied from ground to one side of the half wave rectifier 25 a negative voltage is applied from ground to one side of 26, and vice versa, so that during one half cycle of the applied alternating voltage 25 passes current tending to deflect the meter 15 in one direction, and during the other half cycle 26 passes current tending to deflect meter 15 in the other direction. These currents are equal, and opposite, and meter 15 remains at zero in the center of the scale. The current path is traced from the source through 30, through 26 to 27 and 15. Here the current divides part passing through one half of the voltage divider 27 to ground and part passing through 15, and the other half of 27 to ground, ground being the return to the source of the low-audio frequency. Voltage divider 27 is used to compensate for any slight miss-match of parts in the output unit so that currents due to the applied audio frequency cancel in 15 and cause no deflection.

I have found that the condensers 23 and 24 together with the inductors 30 and 31 may be replaced by resistors, it being easier to obtain a symmetrical circuit with this combination, particularly because it avoids the necessity for a careful matching of the condensers and inductors. Let an audio signal be applied between the common point of the condensers 23, 24, and ground. Then if this signal is greater or less during one half cycle than it is during the other half cycle, the meter 15 will deflect in a given direction.

The output unit 14, may be readily synchronized with input unit 11, by applying as its low frequency alternating voltage the same voltage that is applied to unit 11. Unit 16 accomplishes this. A transformer 32 is necessary for proper phasing of the voltages, but any source of supply may be used, preferably a low frequency audio oscillator.

My adaptation of the single loop antenna to direction finding purposes utilizes the field intensity pattern which results when the loop antenna is not symmetrical with respect to ground. In this pattern the positions of minimum received voltage are displaced, and a difference is introduced in the amplitudes of the maximum received voltages.

Figure 4:
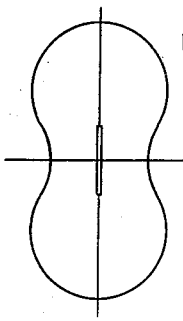
Figures 4, 5 and 6 are examples of other forms of field intensity patterns for unbalanced loop antenna.

The field intensity pattern for the reception of a transmitted wave by a loop antenna is normally in the form of a figure-of-eight, Fig. 3. Lack of symmetry of the loop antenna with respect to ground may result in any of the various forms shown in patterns Figs. 4, 5, and 6. The cause of these changes is the presence of vertical effect (that is, the loop antenna operating as a vertical antenna), and the phasing of this current with the normal loop antenna current.

When the loop antenna is tuned to resonate at the frequency of the signal being received, and the ground is displaced so that vertical effect is present, the current due to this vertical effect is 90° out of phase with the current of the loop antenna. This gives the pattern shown in Fig. 4.

Figure 6:
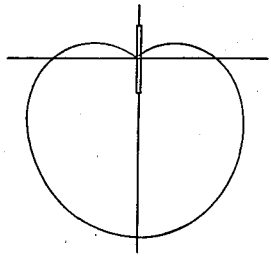
Figure 5:
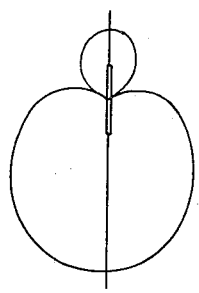

If, however, the loop antenna is not resonated, the current due to the vertical effect is in phase with the current of the loop antenna, and the pattern shown in Fig. 5 or Fig. 6 results, depending on the relative amplitude of the current due to the vertical effect and that due to the loop antenna. This latter form of field intensity pattern, Fig. 5 or Fig. 6, is utilized to provide direct reading indication of the direction of the transmitting station.

Figure 2:
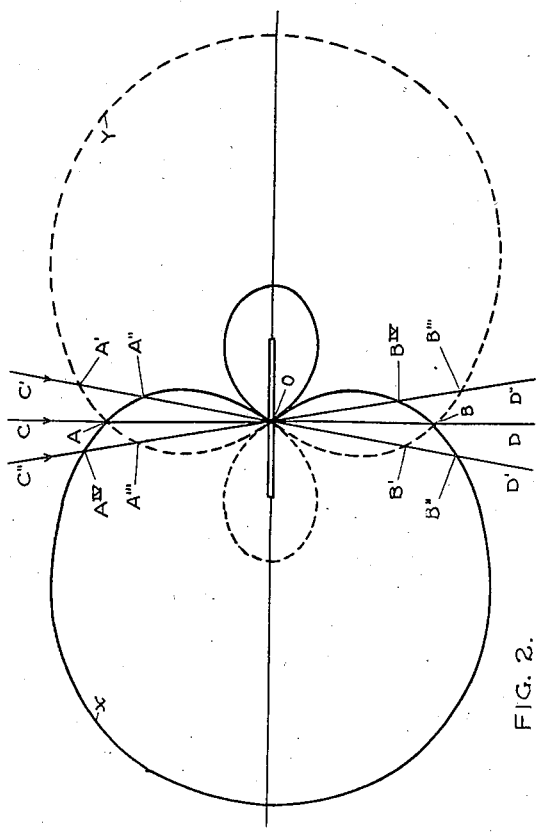
Figure 2 is a diagram showing two field patterns from a loop antenna with phase reversed in rapid succession.

It is possible to obtain two field patterns, X and Y, Fig. 2, from the same loop antenna in rapid succession. In Fig. 2 it may be shown that when the signal being received comes from direction C, the voltage induced in the loop antenna will be the same, OA, for each field pattern. If, however, the signal comes from direction C', the voltage received by the loop antenna for pattern Y will be OA', which is greater than that for pattern X, namely OA''. Suppose, now, that the signal comes from direction C''. The received voltage for pattern Y, namely OA''', will be much less than that for the pattern X, or OA$^{IV}$.

Thus, if means be secured for measuring the relative intensity of these two signals, not only can the direction of the transmitting station be determined, but also the sense of deviation of the line of flight of the airplane from the direction of the transmitting station. As explained in the foregoing, this is accomplished by means of a new output device which tends to deflect a zero-center type course indicating meter in one direction when voltage corresponding to one field pattern is present, and in the other direction when voltage corresponding to the other field pattern is present. When the voltages corresponding to the two field patterns are equal, the currents through the course indicator are equal, and since they oppose each other, the meter is at zero in the center of the scale. When the one received voltage is greater than the other, the meter reading is at one side of zero and when the one received voltage is less than the other the meter reading is at the other side of zero, the amount of deflection depending on the relative amplitudes of the two rectified currents through the course indicator.

This device, in combination with the special single loop antenna arrangement, also eliminates the so-called 180° error. In most direction finders it is necessary to provide a special "sense" antenna to permit the navigator to determine whether the station being received is ahead of him or behind him. Reference to Fig. 2 will indicate how this is accomplished in the model herein described. Suppose that the radio wave is coming from D' instead of C'. In this case the field pattern X gives the greater induced voltage and tends to deflect the course indicating meter in a corresponding direction, opposite from that when the direction of the incoming radio wave was from C' and the field pattern Y gave the greater induced voltage. To determine whether the incoming station is at C' or D' it is necessary only to rotate the loop antenna to "on course" position. If the signal comes from C' the loop antenna is rotated to the right for "on course" indication, while if the signal comes from D' the loop antenna is rotated to the left for "on course" indication.

It may readily be seen that the direction finder described herein is not dependent on any exact balancing of the amount of current due to vertical effect with that due to the normal loop antenna field intensity pattern. As long as sufficient vertical effect is present to distort the normal figure-of-eight pattern in the manner described, the direction finder operates satisfactorily. This means that no balancing devices to secure any relative balance of currents are necessary.

A further advantage of this type of direction finder is that it does not work on the loop antenna minimum. This makes the loop antenna a much more efficient receiving device, and the direction finder is capable of being operated over greater distances than a direction finder using the loop antenna minimum method.

In choosing the source of supply, it should be remembered that the radio receiver used for direction finding has high amplification, and its operation will be seriously disturbed by any source of supply which creates radio interference by sparking of contacts or brushes. A low frequency power source is used, an exact frequency, or a constant frequency being unnecessary. The frequency should, however, be sufficiently low to be readily isolated from any audio signal received by the direction finder.

While I have described and illustrated different examples of my invention, I do not wish to be limited to these specific examples since modifications may be made both in the circuits and apparatus within the scope of my invention.

What I claim is:

1. In a radio direction finder, the combination of a loop antenna having end and center tap terminals, a radio receiver one terminal of the input of which is connected to ground and the other terminal to the center tap of said loop, a pair of rectifiers the space discharge paths of which are respectively coupled between each end terminal of said loop and the ground of said system, and means for alternately energizing the space discharge paths of said rectifiers whereby said rectifiers alternately ground the end terminals of said loop and apply to the input of said radio receiver alternate voltages proportional respectively to the sum and difference of the directional and non-directional receiving patterns of said loop.

2. In a radio direction finder, the combination of a radio receiver, a loop antenna having center tap and end terminals, the center tap being connected to the input of said receiver, a pair of rectifiers the anodes of which are coupled to the end terminals of said loop respectively, and the cathodes of which are connected to the ground of said system, a second pair of rectifiers the anodes of which are coupled to the output of said radio receiver and the cathodes of which are connected together through a center tap resistance the center tap of which is connected to the ground of said system, a meter connected across the terminals of said resistance, and a common means for producing across the anode-cathode paths of all of said rectifiers alternating voltages, the voltages applied to each rectifier of each pair being one hundred eighty degrees out of phase with respect to the voltage applied to the other rectifier of that pair, whereby the space pattern of said loop is reversed periodically as a function of the alternating voltages applied to the rectifiers by said means and whereby the deflection of said meter indicates the directional and angular location of the source of radio energy received by said loop with respect thereto.

3. In a radio direction finder, the combination of a single antenna of the loop type having end and center tap terminals, a radio receiver connected to be energized from said center tap terminal, two rectifying devices each coupled between an end terminal of said loop antenna and ground, means for supplying out of phase alternating voltages to said rectifiers whereby said rectifiers alternately pass current and effectively reverse the position of ground with respect to the center tap of said loop antenna and thereby reverse the field responsive pattern of said loop antenna a zero center course indicating meter, and means for switching the output of said radio receiver to said meter so that the output voltage of said radio receiver deflects said course indicating meter to the right for one condition of switching of the input circuit, and to the left for another condition of switching of the input circuit by amounts dependent upon the strength of the output currents derived from said receiver under the alternate input switching conditions.

4. In a radio direction finder, a single antenna of the loop type for receiving radio frequency voltage from a transmitting station, a center and two end terminals for said loop antenna, means for alternately grounding in rapid succession said end terminals thereby producing for the half of the loop between the center and the grounded end terminal a dissymetrical receiving pattern equivalent to the combination of the directional effect of said half of the loop and the vertical or non-directional effect of the whole loop existing by virtue of its capacitance to ground, amplifying means, means for impressing upon said amplifying means the voltage induced between the center terminal of said loop antenna and the alternately grounded end terminals, whereby said alternate voltages are proportional respectively to the sum and difference of said vertical effect and one-half of the directional effect of said loop antenna.

5. In a direction finder including a circuit and a signal responsive means at the output of the circuit, a single antenna of the loop type as a sole pick-up device, a radio receiver in the circuit, and electrical switching and rectifying means for alternately displacing the ground connection to said loop antenna on either side of the effective center of said loop thereby producing a vertical effect by virtue of the capacitance of said loop to ground, said switching and rectifying means serving at the same time for alternately reversing the directional effect of said loop antenna with respect to said vertical effect and impressing voltages proportional to the alternate combinations of said directional and vertical effects upon said radio receiver.

6. In a radio direction finder the combination with a radio receiver, of an input unit for the receiver including a single antenna of the loop type with two end terminals and a center tap terminal, said input unit having means for alternately grounding said two end terminals and impressing upon the input of said radio receiver the voltage induced in said loop antenna between said center tap and said grounded end terminal, an indicating meter, an output unit connected in the output of said radio receiver and having means for passing the output current of said radio receiver alternately in opposite directions through said indicating meter, and synchronizing means providing an alternating voltage of substantially low frequency and connected to and for controlling the switching operations in said input and output units and for synchronizing said switching operations, whereby for one connection of the loop antenna a current of intensity corresponding to the voltage induced in one-half of said loop antenna passes in one direction through said indicating meter while for the alternate connection of the loop antenna a current of intensity corresponding to the voltage induced in the other half of said loop antenna passes in the opposite direction through said indicating meter.

7. A radio direction indicator comprising a source of locally generated current, a directive antenna system, means energized from said source for modulating currents received by said directive antenna system, a circuit coupled to and operable with said directive system for providing the effect of a non-directive antenna and in which modulated current from said directive system is combined with said non-directive antenna currents to produce combined currents, means for amplifying and detecting said combined currents, and an output circuit comprising two audio frequency valve paths, a course indicator connected across said valve paths, means for supplying said combined currents in parallel to said two valve paths, and means for supplying current at the frequency of said source to said two valve paths whereby the resultant currents in said paths and across the terminals of said course indicator will be equal to the sum or difference of the current from said source and said combined currents.

8. A radio direction indicator comprising a source of locally generated current, a directive system, means energized from said source for modulating currents received by said directive antenna system, a circuit coupled to and operable with said directive system for providing the effect of a non-directive antenna and in which modulated current from said directive system is combined with said non-directive antenna currents to produce combined currents, means for amplifying and detecting said combined currents, and an output circuit comprising two audio frequency valve paths, a course indicator connected across said valve paths, means for supplying said combined currents in parallel to said two valve paths, and means for supplying current at the frequency of said source to said two valve paths whereby the resultant currents in said paths and across the terminals of said course indicator will be equal to the sum or difference of the current from said source and said combined currents, and separate means each energized by said local source for separately energizing said first-named means and said means for supplying current to the two valve paths.

9. A direction indicating system comprising a directive antenna system for receiving incoming radio frequency radiations, a local source of alternating current, a circuit for modulating currents received in said directive antenna system, means for securing from currents induced in said system resultant currents having a frequency equal to the frequency of said local source, an amplitude dependent upon the deviation of a line perpendicular to the plane of said antenna system from a line joining the center of said system and the source of incoming radiations, and a phase dependent upon the sense of said deviation, a course indicating device, an output switching circuit for alternately supplying said resultant currents to the terminals of said course indicating device, and means coupled to said local source for separately energizing said modulating circuit and said output switching circuit.

10. A direction indicating system comprising a directive antenna system for receiving incoming radio frequency radiations, a local source of alternating current, a circuit for modulating currents received in said directive antenna system, means for securing from currents induced in said system resultant currents having a frequency equal to the frequency of said local source, an amplitude dependent upon the deviation of a line perpendicular to the plane of said antenna system from a line joining the center of said system and the source of incoming radiations, and a phase dependent upon the sense of said deviation, a course indicating device, an output switching circuit for alternately supplying said resultant currents to the terminals of said course indicating device, and means comprising said local source for synchronously energizing said modulating circuit and said output switching circuit.

WILBUR S. HINMAN, Jr.